J. M. S. FONTECHA.
SAFETY DEVICE FOR POLYPHASE CURRENTS MACHINERY.
APPLICATION FILED NOV. 27, 1908.
934,063.
Patented Sept. 14, 1909.
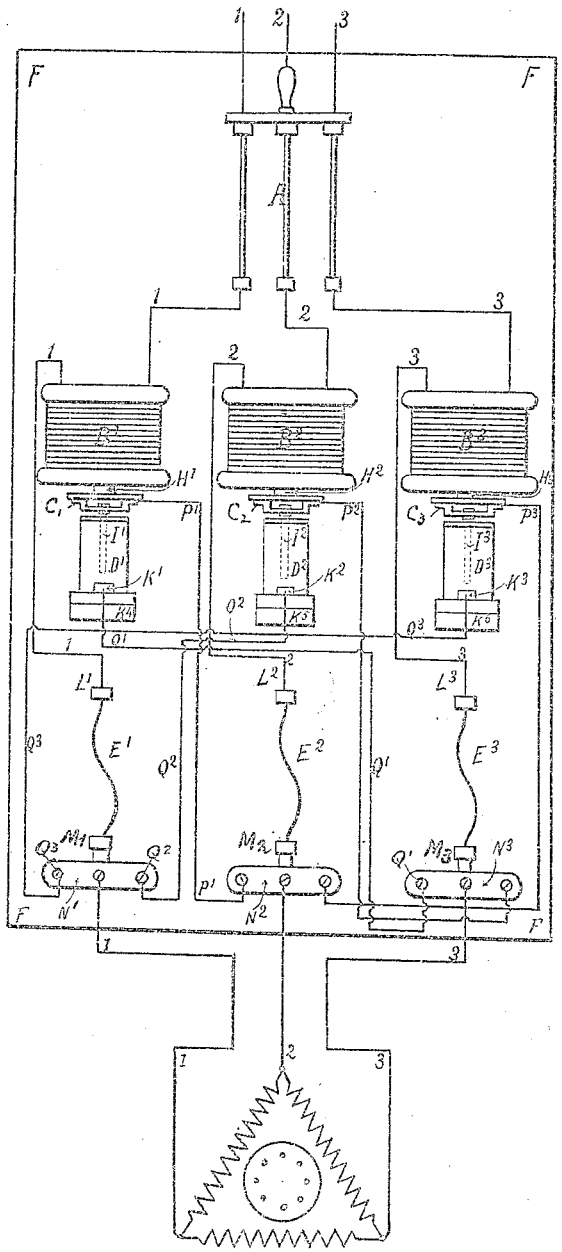

UNITED STATES PATENT OFFICE.

JUAN MANUEL SANCHEZ FONTECHA, OF MEXICO, MEXICO.

SAFETY DEVICE FOR POLYPHASE-CURRENTS MACHINERY.

934,663.

Specification of Letters Patent. Patented Sept. 14, 1909.

Application filed November 27, 1908. Serial No. 464,305.

*To all whom it may concern:*

Be it known that I, JUAN MANUEL SANCHEZ FONTECHA, a citizen of the United Mexican States, residing in the city of Mexico, Federal District, United Mexican States, have invented a new and useful Safety Device for Polyphase-Currents Machinery, of which the following is a specification.

The object of my invention is to provide a simple and reliable arrangement of apparatus and wiring for protecting from injury by the current, motors and any electrical appliances in a polyphase circuit in case of the interruption of current in any one phase. Under present conditions if for any reason such as the melting of a fuse, the accidental opening of a circuit-breaker or other safety device in the line of one phase the current of that phase fails, the motor burns out, frequently causing extensive damage all along the line, not only to the other motors thereon but also to the wiring and connections. The present invention prevents such results by breaking a second phase as soon as the first fails. I attain this result by the wiring, the devices and their arrangement illustrated in the accompanying drawing which is a diagrammatic view of my device.

The entire apparatus is mounted on the slab F of marble, slate, or other suitable insulating material, on the back of which the wiring is run between suitable binding screws running through the slab to make contact with the various points involved. The current comes from the mains into the apparatus through the three wires 1, 2, and 3, each carrying one phase, and led to the three-pole switch A, which permits the entire current to be shut off or turned on the motor. From the switch the currents pass through the solenoids $B_1$, $B_2$, and $B_3$ respectively, one for each phase, each identical in construction. Considering now only the lead of phase 1, as the other two are exactly identical with it, the movable solenoid core $H_1$ carries a crosshead $C_1$ to the center of which is secured the contact-plunger $I_1$ passing through a suitable guide in the cover of the pot $D_1$, at the bottom of which is secured the vessel $K_1$, filled with a suitable conducting liquid, for the purpose of making a complete connection between the plunger $I_1$ and the base $K_4$ of the pot $D_1$, when the plunger is dropped. Under the pot $D_1$ is mounted the safety fuse $E_1$ or any other suitable device for automatically breaking the circuit in case of excessive current. It is mounted between terminals $L_1$ and $M_1$, the latter of which is directly connected with the terminal manifold $N_1$.

The current of phase 1 passes out of the solenoid coil to terminal $L_1$, through safety fuse $E_1$ to terminal $M_1$, connected with the terminal manifold $N_1$, whence it enters the motor. To a suitable permanent contact on crosshead $C_1$ is attached the end of lead $P_1$ connected directly with terminal $N_2$ of the second phase. To the base $K_4$ of the pot $D_1$ of phase 1 is permanently attached the lead $Q_1$ connected directly with the terminal $N_3$ of the third phase. Similarly, $C_2$ of the second phase is connected with the third phase terminal $N_3$, while the base $K_5$ is connected to the terminal $N_1$ of the first phase, and again $C_3$ of the third phase is connected to $N_2$ of the second, and the base piece $K_6$ is connected to terminal $N_1$ of the first phase. It is thus clear that if all the contact plungers are dropped there will be at each pot a short circuit between the two phases not in the circuit of the pot considered. Thus, at $D_1$ there will be a short circuit between the second and third phases, at $D_2$ between the first and third, and at $D_3$ there will be a short circuit between the first and second phases. In each case the short circuit will be completed in a known way.

When the switch A is closed the current passes in all the phases, the three solenoid cores are immediately lifted and the three contact plungers have their lower ends clear of the vessels containing conducting liquid. The currents pass from their respective solenoid coils through their safety fuse to the motor. If now the fuse of say phase 1 should melt at the distribution box, or for any other reason the circuit of phase 1 be broken, its solenoid $B_1$ becoming de-magnetized allows the core $H_1$ to drop, causing the end of contact plunger $I_1$ to dip into the fluid in vessel $K_1$. This completes the connection between $C_1$ and $K_4$, hence between the second and third phases, causing the safety fuse in at least one of these phase circuits to melt, which at once stops the motor and restricts the damage to renewing the melted fuses. In my practice I have found that usually the fuses in both phases thus short-circuited melt, but with the melting of only one the current flowing through the motor is reduced to a single phase so that it is bound to stop at once.

If there is a break in one of the circuits before the main switch A is thrown in the solenoid core of that phase will remain down, causing a short-circuit between the two other phases as before, so that the motor will not start, or, if it should start, will stop almost immediately thereafter upon the melting of either or both of the fuses of the phases connected. An extension of this arrangement will provide safety to an installation of any number of phases, but in the present state of the art it is principally useful for the tri-phase system. Yet it is clear that should the advances of science produce advantageous applications of 4, 5, 6, or more phases exactly the same arrangement, with suitable cross-connections will, upon the failure of one phase, quickly break all the other phases, or, at least, all but one.

The more mechanical details of the apparatus here described such as the crosshead, the contact plunger, and the plunger-pot, as well as the essentially electrical details such as the fluid-filled contact-vessel, and the safety fuse, may be varied as to construction in many ways without affecting the inventive idea here embodied, which consists mainly in the arrangement of the wiring on the apparatus, by which a gap is provided in a connection between any two phases, which will be automatically and instantly closed upon failure of current in the third.

I claim:

1. A safety device for polyphase current machinery consisting of means controlled and operated by each phase for automatically connecting together two other phases upon failure of current in a third phase.

2. A safety device for polyphase current machinery consisting of means controlled and operated by each phase for automatically short-circuiting two complete phases upon interruption of current in a third phase.

3. A safety device for tri-phase current machinery consisting of means controlled and operated by each phase independently of the others, for automatically connecting together the two other phases upon failure of current in any one phase.

4. A safety device for tri-phase current machinery consisting of means controlled and operated by each phase independently of the others, for automatically short-circuiting two complete phases upon interruption of current in the third phase.

5. In a safety device for tri-phase current machinery a safety fuse in each phase, and means in each circuit, controlled and operated by the current of said circuit for automatically short-circuiting the two other circuits upon failure of current in one circuit.

6. In a safety device for tri-phase current machinery a device in each phase maintaining normally by action of the current in said phase a gap in a short-circuit connection between the two other phases as long as said circuit remains complete, and automatically closing said gap upon failure of current in said circuit.

7. In a safety device for tri-phase current machinery a solenoid in each phase, an electric connection between the core of said solenoid and one of the two remaining phases, a contact connected with the other of said remaining two phases, means for normally keeping said core from electrical connection with said contact, and, for automatically closing the said connection upon failure of current in said phase.

8. In a safety device for tri-phase current machinery a solenoid in each phase, an electric connection between the core of said solenoid and one of the two remaining phases, a contact plunger attached to said core, a contact-pot containing a conducting liquid, electric connection between said conducting liquid and the other of said two remaining phases, the said plunger of such length that when said core is sucked up by the solenoid it will be clear of said conducting liquid, but that when it is dropped by the de-magnetization of said solenoid its end will dip into said conducting liquid.

In testimony, that I claim the foregoing as my invention, I have signed my name in presence of two subscribing witnesses.

JUAN MANUEL SANCHEZ FONTECHA.

Witnesses:
 FLO. URALES CIOLAGOS,
 E. M. JULIA.